United States Patent [19]

Bürkner

[11] Patent Number: 4,504,182

[45] Date of Patent: Mar. 12, 1985

[54] PROCEDURE FOR CONTROLLING THE DENSITY DISTRIBUTION OF WOOD CHIPS AND DEVICE THEREFOR

[75] Inventor: Wolfgang Bürkner, Darmstadt, Fed. Rep. of Germany

[73] Assignee: Carl Schenck AG., Fed. Rep. of Germany

[21] Appl. No.: 392,334

[22] Filed: Jun. 28, 1982

[30] Foreign Application Priority Data

Jul. 4, 1981 [EP] European Pat. Off. ........ 81105215.8

[51] Int. Cl.³ ........................ B65G 65/42; B65G 65/40

[52] U.S. Cl. .................................... 414/327; 222/281; 222/318; 406/70; 414/325; 414/786

[58] Field of Search ........................ 414/304, 325-327, 414/786; 198/524, 580; 222/287, 318; 406/70, 106

[56] References Cited

U.S. PATENT DOCUMENTS

| | | | |
|---|---|---|---|
| 2,688,393 | 9/1954 | Uschmann | 414/325 X |
| 3,719,290 | 3/1973 | Voigtlaender | 414/327 |

*Primary Examiner*—Robert G. Sheridan

*Attorney, Agent, or Firm*—Connolly and Hutz

[57] ABSTRACT

A chip material container arrangement is provided for storage of material to be spread in the production of particle and/or fiber boards. The container arrangement is equipped with several discharge rollers arranged one above the other, a base belt and feeder devices. With a discharge opening extending over the width of the container, the density distribution of the material to be spread is controlled by removing appropriately dimensioned material quantities from individual partial streams which partial streams are later combined in the area of the discharge opening to form a total material flow.

8 Claims, 6 Drawing Figures

PROCEDURE FOR CONTROLLING THE DENSITY DISTRIBUTION OF WOOD CHIPS AND DEVICE THEREFOR

BACKGROUND OF THE INVENTION

The present invention concerns a procedure and a device for influencing the density distribution of wood chips to be spread over a specific width.

The problem of uniform spreading of wood chips has long been known. For example, German Pat. No. 2214 900 suggests a spreader device for equalization of different surface weights in the transverse direction of wood or fiber chips or similar materials, for the production of particle boards, fiber boards, and the like. A form base below the spreader device and movable in relation thereto is provided with a flexible conveyor belt for dosage, arranged above the form base and sliding along a support, and with a stripper roll rotating over the same, vertically to the transport direction, for the chips, fibers, or the like which have been spread over the dosage conveyor belt. The width of the opening between the dosage conveyor belt and the stripper roll varies over its length. The height of the dosage conveyor belt below the stripper roll is continuously adjusted in the transverse direction. The purpose of this device is to influence the quantity of chips exiting between the stripper roll and the dosage conveyor belt, which quantity is subsequently being spread, all this in respect to the distribution of surface weight.

As a consequence of the increased discharge performance of such dosage containers, the discharge process is currently executed according to the method disclosed in German Pat. No. 1084 199. By means of the spiked rollers arranged one above the other, the chip goods are milled off over the entire cross section of the supply of chips.

However, it has been found that in this case, it is not possible to utilize a device according to German Pat. No. 2214 900 for equalization of varying surface weights of wood or fiber chips or the like in the transverse direction, when particle boards, fiber boards, etc., are being produced, since the elevation of the base belt causes merely a local concentration of the chip goods, without effecting a change in the discharge.

Currently, even when spreader machines are utilized where the discharge and the spreading of chip goods no longer are executed through an opening between the supply container and the stripper roll and the subsequent strike-off roll but rather by means of a cascade from discharge rollers arranged above one another and developed as spiked rolls, system-related errors still occur in the chips that have been spread. These errors, in turn, cause errors in the density. Also, it is impossible to press the spread-out chips with a predetermined density distribution.

SUMMARY OF THE INVENTION

Consequently, the purpose of the present invention is to suggest a procedure and a device for execution of this procedure, whereby the abovementioned problems are solved. According to the invention, a stream of material to be spread consists of several partial streams, and the volume of at least one partial stream is reduced in at least one location over its width. By removing spreading particles from one partial stream which joins other partial streams in a cascade to form one total flow, the density distribution over the spreader width of wood chips is actively controlled.

As execution of the inventive procedure, it is suggested that for the reduction of at least one partial stream, variable partial quantities are removed at several locations across its width. By removing variable partial quantities across the width of at least one partial stream, it is obvious that when the flow of chips comprises several partial streams arranged above one another, the density distribution over the width can be controlled in accordance with a predetermined profile for the chips.

For the implementation of the procedure, a device is suggested, consisting of a chip supply container, several discharge rollers arranged above one another, a base belt, feeder devices, and a discharge opening extending over the width of the supply container, which device is characterized thereby that several suction pipes with predetermined width and vertically and laterally adjustable, are arranged against the discharge rollers. Outside of the enclosure of the device there is a combined connection for the suction. By means of this device, which may be provided with mechanical diversion devices instead of the suction pipes, such as guide plates or rollers, an irreversible reduction of the quantity of at least one partial stream is achieved.

Another aspect of the present invention involves removal of the chip mass portion from only the upper half of the discharge rollers. Under certain circumstances this expedient is desired in that it produces an even distribution and avoids the appearance of drastic changes in the distribution which might otherwise occur if partial removal of the chip mass was from only the lower roller.

In yet another execution of the object of the invention, it is suggested that the suction pipes are selectively positioned in front of the discharge roller in relation to a predetermined density distribution over the width of a wood chip flow. The selection and positioning may occur by means of electrical, hydraulical, or pneumatic positioning impulses to the individual suction pipes or guide plates according to the specifications given by the manufacturer.

BRIEF DESCRIPTION OF THE DRAWING

Novel features and advantages of the present invention in addition to those mentioned above will become apparent to those skilled in the art from a reading of the following detailed description in conjunction with the accompanying drawings wherein.

Figure 1:
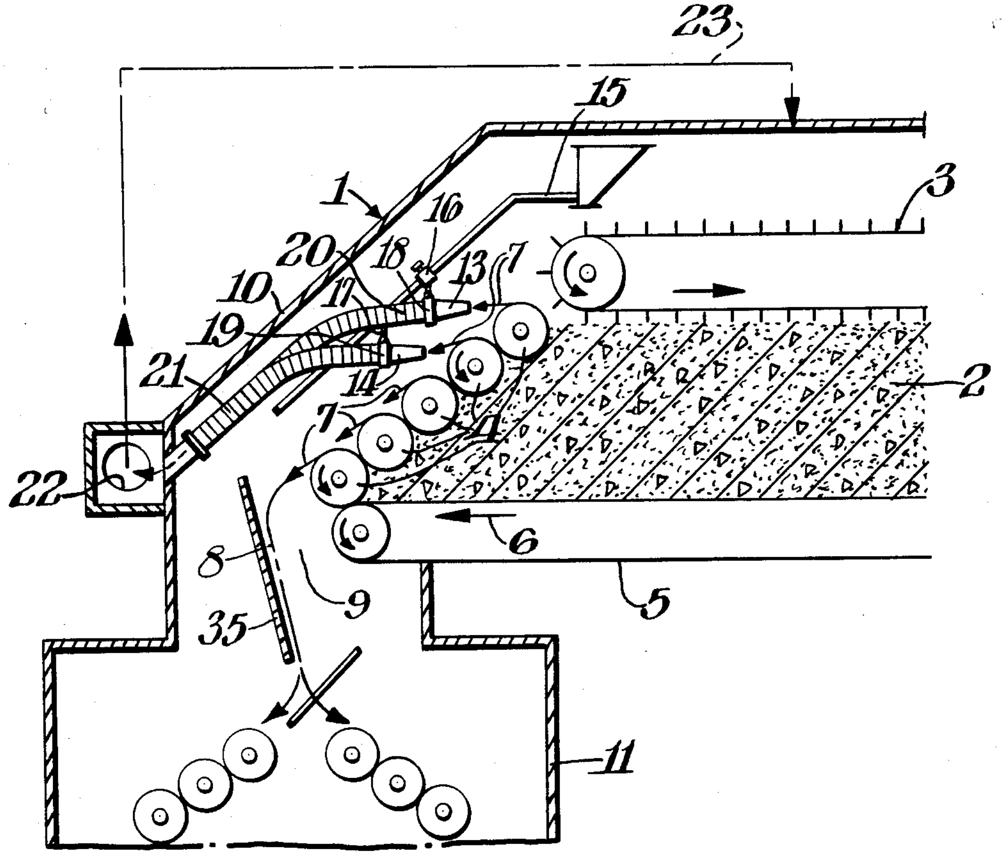
FIG. 1 is a schematic side elevational view with portions in cross section of a device, according to the present invention.
Figure 2:
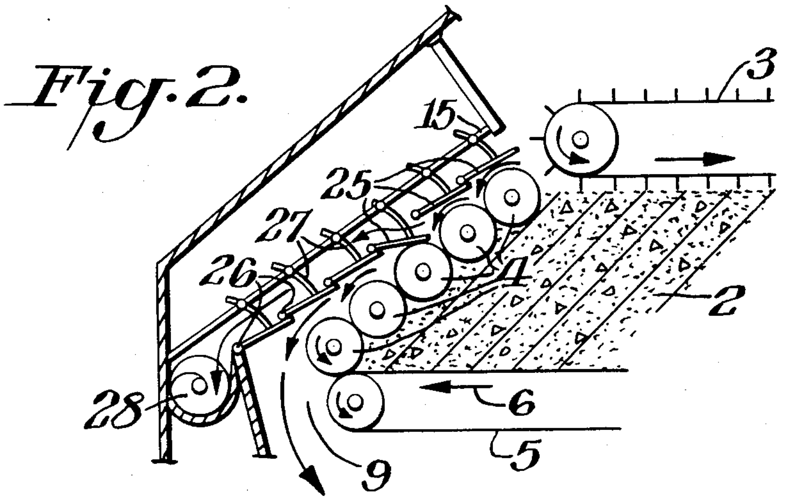
Figure 1A:
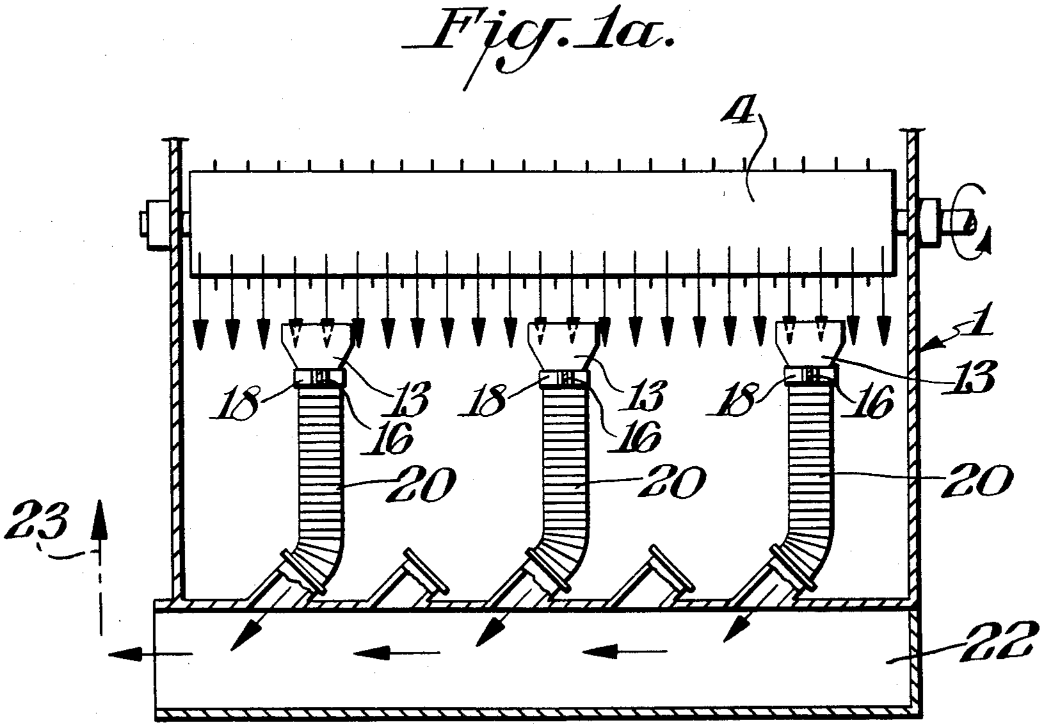
Figure 1B:
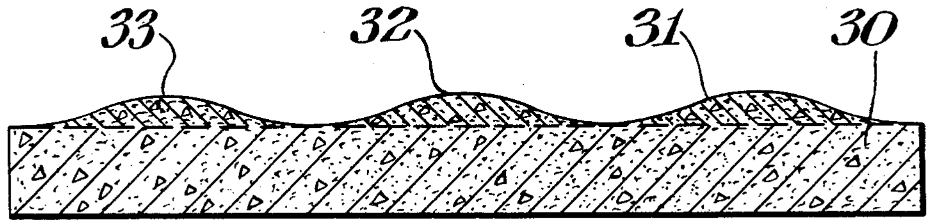

FIG. **1*a* is a top plan view of the suction pipe arrangement and one discharge roller of the device of FIG. 1**;

FIG. **1*b*** is a cross sectional view of the chip mass without correction of its variable distribution of particles;

FIG. **1*c* is a view similar to FIG. 1*b*** illustrating a controlled density distribution;

FIG. 2 is a schematic side elevational view of another device, according to the present invention; and FIG. **2*a* is a top plan view of the device shown in FIG. 2**.

DETAILED DESCRIPTION OF THE INVENTION

In a supply container 1, which in the execution example is shown as a container with a base belt, the chip material 2 to be spread is fed into the container by means of a feeder device 3. The feeder device 3 may be developed as a scoop belt in order to add the chip material to be momentarily supplied to the chip material 2 already stored in the container. Discharge rollers 4 effect the discharge of the chip material 2 which is to be spread. Due to the rotation of a base belt 5 in the direction of the arrow 6, the entire chip material contents of the supply container 1 are pushed forwards against the rotating discharge rollers 4, and the discharge rollers 4, which are developed as spiked rollers, mill off the entire exit cross section of the chip material quantity stored in the container. Thereby, partial streams 7 are generated over the entire spreading width of the container. These streams combine to form a chip flow 8 which leaves the container via a discharge opening 9 and which extends over the width of the container. The discharge rollers are arranged behind an enclosure 10 in the container.

After the exit from the discharge opening 9, the chip flow 8 is led via a deflection plate 35 to a spreader head 11, which, for instance, effects the distribution of the chip flow to several spreader locations. However, instead of the spreader head 11, it is also possible to apply a conveyor belt, not shown in the drawing, as a form belt, on which the flow 8 is deposited as wood chips when the form belt is moved.

Rows of suction pipes 13 and 14, with a predetermined suction surface, are provided between the enclosure 10 and the discharge rollers 4. FIG. 1*a* shows, schematically, a row of suction pipes 13 positioned over the entire width of the container. Via suction hoses 20,21, the chip material which has been suctioned off is led to a collection line 22 by means of which the return transport to the container entrance is effected via line 23, as shown in greater detail in FIG. 1.

Figure 1C:
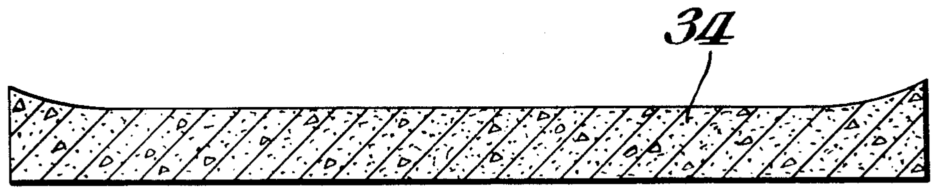

FIG. 1*b* represents the incorrect cross section of a wood chip mass 30, when no suction has been exerted. By means of suction via the suction pipes 13, the elevations 31, 32, and 33 are removed, so that the result is a chip mass with an even surface. By means of removing increased quantities of chip material via the suction pipes 13, it is also possible to achieve a predetermined surface contour 34, which is represented to FIG. 1*c* as elevated edges of the chip mass.

The suction pipes 13 are maintained in position by means of a retainer device 15. By means of joints 16 and 17 and the related holding devices 18,19, it is possible to move the prepositioned suction pipes 13 and 14 along the retainer device 15 as well as perpendicularly to it over the entire cross section of the discharge area, covered by the discharge rollers 4, and also to fix the suction pipes at predetermined locations. Preferably, all suction pipes 13,14 are connected with suction hoses 20,21 which lead to a collection line 22 through an opening in the enclosure 10, from which collection line the suctioned-off chip quantities are returned the shortest way to the supply container 1 via an additional line 23. This line 23 may be a pressure line, in which the transport is effected by means of compressed air, or, in combination with guide surfaces, a feed screw can also be provided.

Figure 2A:
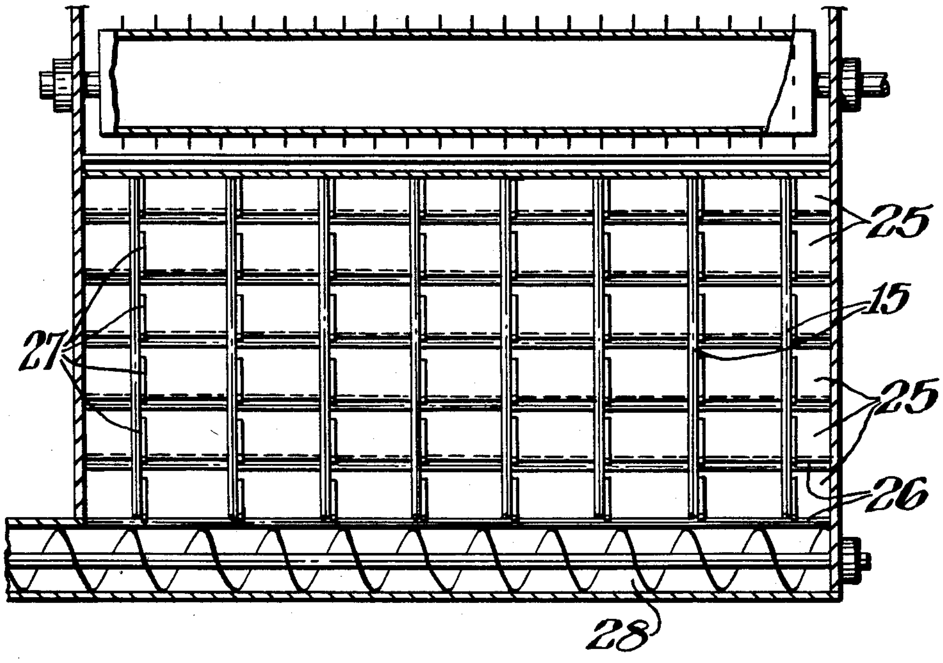

Instead of the suction pipes 13,14, which are connected to a negative pressure system, it is also possible to use guide surface plates 25 of predetermined dimensions, comparable to the suction surfaces of the suction pipes, as shown best in FIGS. 2 and 2*a*. These guide surface plates 25 are arranged in similar fashion to the arrangement of suction surfaces. Each surface 25 is pivotally mounted at 26 and adjustably connected to the retainer 15 by arms 27. The guide surfaces are individually adjustable at their pivot points and appear like louvered plates. They function to transport their partial quantities to a collection container located within the enclosure, e.g. a feed screw 28, which extends over the entire spreader width of the container. This feed screw takes over the removal of the partial quantities originating at the individual guide surfaces. The particles may be recycled in the same manner as shown in FIG. 1.

What is claimed:

1. A device for controlling the density distribution of wood chips over a specified width comprising a chip supply container, several discharge rollers arranged one above the other, a base belt, feed devices, and a discharge opening extending over the width of the container, characterized thereby that at least one suction pipe with predetermined width and adjustable in both vertical and transverse directions is arranged close to and in front of the discharge rollers for removing a portion of the chip mass discharged from the rollers, and a chip collection device connected to the suction pipe.

2. A device according to claim 1, characterized thereby that the at least one suction pipe is arranged against the discharge rollers at a position in the upper half thereof.

3. A device according to claims 1 or 2, characterized thereby that the at least one suction pipe is selectively positioned in front of the discharge rollers in relation to a predetermined density distribution over the width of a chip mass discharged from the rollers.

4. A device for controlling the density distribution of wood chips over a specified width comprising a chip supply container, several discharge rollers arranged one above the other, a base belt, feed devices, and a discharge opening extending over the width of the container, characterized thereby that at least one guide surface plate having a predetermined width is arranged close to and in front of the discharge rollers for removing a portion of the chip mass discharged from the rollers, an adjustable connection for the guide surface plate for adjusting the position of the surface of the plate relative to the discharge rollers, and a chip collection device connected to the guide surface plate.

5. A method for controlling and unifying the density distribution of wood chip material or the like to be spread over a specific width, comprising the steps of downwardly flowing several partial streams of wood chip material or the like from a supply source to a discharge, determining which partial streams include excess material sufficient to cause a non-uniform density distribution of the material over the specified width, removing excess material between the supply source and discharge from those downwardly flowing streams determined to be excessive, and combining the adjusted and remaining partial streams into a discharge mass flow.

6. A method as in claim 5 including the step of dividing the discharge mass flow into several separate discharge mass flows.

7. A method as in claim 5 including the step of recycling the removed excess material to the supply source.

8. A method as in claim 5 wherein the excess material is removed by suction.

* * * * *